United States Patent Office 2,852,554
Patented Sept. 16, 1958

2,852,554

α-SULFOPOLYFLUOROMONOCARBOXYLIC ACIDS AND DERIVATIVES HYDROLYZABLE THERETO

David C. England, Holly Oak, Del., assignor to E. I. du Pont de Nemours and Company, Wilmington, Del., a corporation of Delaware No Drawing. Application July 12, 1956
Serial No. 597,321

17 Claims. (Cl. 260—481)

This invention relates to a new class of polyfluoroacids and more particularly to a new class of polyfluorosulfocarboxylic acids and derivatives thereof.

Certain mixed carboxylic sulfonic dibasic acids are known, including the short chain sulfoacetic acids wherein the carboxyl and sulfonic acid groups are linked directly to the same carbon atom. Certain of the monohalosulfoacetic acids are also known, including both the bromo and chloro derivatives. However, these acids are not generally preparable by simple high yield procedures and particularly in the case of the bromo and chloro acids are not as stable as is desired.

This invention has as an object the provision of a process for the preparation of new dibasic organic acids. A further object is the preparation of new compounds having bactericidal utility. Another object is the preparation of compositions for protecting woolen fabrics against attack by larvae of the black carpet beetle. Other objects will appear hereinafter.

These objects are accomplished by the present invention of α-sulfopolyfluorocarboxylic acids and the functional derivatives thereof hydrolyzable thereto containing one sulfo (—$SO_3H$) group and one carboxyl (—COOH) group, or groups hydrolyzable respectively thereto, each singly linked to the same fluorine-bearing carbon, which carbon is otherwise singly linked to at most one other fluorine or a polyfluorocarbon radical, saturated aliphatic in character and containing other than carbon and fluorine at most one hydrogen and that on the omega carbon, i. e., omega to said fluorine-bearing carbon, of said radical.

The acids can also be formulated as containing the —$SO_2R$—CO— moiety wherein R is a divalent geminal polyfluorocarbon radical saturated aliphatic in character and having fluorine on the carbon bearing the two free valences and containing in addition to fluorine and carbon at most one other atom and that hydrogen on carbon omega to the carbon bearing the free valences. R is preferably a polyfluoroalkylidene radical having on carbon only fluorine and at most one hydrogen and that omega. These new α-sulfopolyfluorocarboxylic acids and derivatives have a hydrogen-free α-carbon atom to which is bonded directly and singly two fluorine atoms, or one fluorine atom and an aliphatically saturated, monovalent polyfluorocarbon radical aliphatic in character, i. e., acyclic or cycloaliphatic, and containing other than carbon and fluorine at most one hydrogen and that on the omega carbon, i. e., terminal carbon, of said radical, and the carboxylic and sulfonic acid groups or derivatives thereof hydrolyzable thereto.

These new acids and their derivatives can be also formulated with the simple structural formula $$A-\underset{X}{\underset{|}{\overset{F}{\underset{|}{C}}}}-B$$

wherein A represents a carboxyl group and B a sulfo group, or groups respectively hydrolyzable thereto and X represents fluorine or a monovalent perfluorocarbon or omega monohydroperfluorocarbon radical saturated aliphatic in character. These new α-sulfopolyfluorocarboxylic acids and derivatives thereof are stable, both chemically and physically, and yet have fully reactive sulfonic and carboxylic acid functions which are capable of reaction under controlled conditions to afford a wide variety of useful derivatives of the α-sulfopolyfluorocarboxylic acids.

The following examples in which parts are by weight are illustrative of the invention.

EXAMPLE I

*Part A.—Preparation of 3,3,4,4-tetrafluoro-2,2-dioxo-1,2-oxathietane*

A pressure reactor fabricated from borosilicate glass and fitted with a gas entry tube, a thermocouple well, and means for shaking was charged with 212 parts of freshly distilled, anhydrous liquid sulfur trioxide (which had been condensed at room temperature to prevent any polymerization) and the reactor was then pressured, while being shaken, to 40 lb./sq. in. gauge with gaseous tetrafluoroethylene. An exothermic reaction set in at once. The reactor was packed with ice and thereby cooled to bring the internal temperature below 80° C. Gaseous tetrafluoroethylene was repressured as needed to maintain the internal pressure at 40 lb./sq. in. gauge over a period of about one hour, after which no further absorption of tetrafluoroethylene was obtained. A total of about 265 parts of tetrafluoroethylene was absorbed. The reactor was then bled to the atmosphere, allowed to warm to room temperature, and the reaction mixture removed and fractionated. There was thus obtained 442 parts (92.8% of theory) of 2-hydroxytetrafluoroethanesulfonic acid sultone (3,3,4,4-tetrafluoro-2,2-dioxo-1,2-oxathietane) as a clear, colorless liquid boiling at 42° C. at atmospheric pressure. Nuclear magnetic resonance spectra indicated the presence of no other compound.

Another identical preparation resulted in substantially the same results. The product on analysis exhibited a neutral equivalent of 44.9 and 45.2 (theory for pure 2-hydroxytetrafluoroethanesulfonic acid sultone being 45.0).

Another similar preparation using 16 parts of undistilled stabilized liquid sulfur trioxide (known commercially as "Sulfan B") resulted in the isolation of 19.3 parts (53.5% of theory) of 2-hydroxytetrafluoroethanesulfonic acid sultone as a clear, colorless liquid boiling at 42° C. and exhibiting a characteristic nuclear magnetic resonance spectrum for the sultone.

*Analysis.*—Calculated for $C_2F_4O_3S$: S, 17.8%; F, 42.2%; N. E., 45.0. Found: S, 18.1%, 18.1%; F, 41.6%, 40.7%; N. E., 45.5.

This compound and the preparation thereof form a part of and are explained more fully in the copending application of Anderson and England, application Serial No. 552,224, filed December 9, 1955.

*Part B.—Preparation of fluorosulfonyldifluoroacetyl fluoride*

About 0.3 part of triethylamine was added with stirring to 180 parts of the above sultone at room temperature. A vigorous and exothermic reaction occurred at once and the liquid reaction mixture was stirred at room temperature with the temperature of the refluxing vapor slowly decreasing. When the vapor temperature had dropped to 33° C. the reaction mixture was cooled and distilled at atmospheric pressure through a short (16 inch) indented fractionation column. There was thus obtained 136 parts (about 75% of theory) of fluorosulfonyldifluoroacetyl fluoride as a clear, colorless liquid, boiling at 29° C. at atmospheric pressure.

The rearrangement was graphically confirmed by nuclear magnetic resonance. The spectrum of the sultone consists of two peaks of equal intensity indicating equal amounts of two kinds of fluorine. After rearrangement to fluorosulfonyldifluoroacetyl fluoride, the spectrum shows three peaks in the intensity ratio of 1:1:2. The two equally intense peaks are shifted to the "acid fluoride" region of the spectrum and correspond to the fluorine atoms in the —COF and —SO$_2$F groups. The remaining peak of double intensity corresponds to the fluorine atoms in the —CF$_2$— group.

EXAMPLE II

*Preparation of fluorosulfonyldifluoroacetic acid*

A solution of 94 parts of fluorosulfonyldifluoroacetyl fluoride in 200 parts of ligroin was chilled to 10° C. and 9.5 parts of water was added to the solution slowly with stirring. An exothermic reaction occurred and the reaction mixture was stirred at the reflux for about ½ hour and then allowed to stand at room temperature. Two layers formed in the reaction mixture and the lower one was drawn off and warmed on a steam bath until all noticeable traces of ligroin were gone. There was thus obtained 86 parts (75% of theory) of fluorosulfonyldifluoroacetic acid as a clear liquid, boiling at 88–90° C. under a pressure corresponding to 45 mm. of mercury. Nuclear magnetic resonance spectra were consistent with the structure, showing the correct fluorine peaks and proton resonance for one acidic hydrogen.

*Analysis.*—Calculated for $C_2HF_3O_4S$: S, 18.0%; F, 32.0%; N. E., 59.3. Found: S, 17.3%; F, 30.4%; N. E., 62.8.

Another preparation substantially identical resulted in a 62% yield of fluorosulfonyldifluoroacetic acid, as a clear, colorless liquid boiling at 104–106° C. under a pressure corresponding to 143 mm. of mercury; $n_D^{25}$, 1.3604.

EXAMPLE III

*Preparation of sulfodifluoroacetic acid and the barium and calcium salts thereof*

A solution of 17.8 parts of fluorosulfonyldifluoroacetyl fluoride and 12 parts of sodium hydroxide in 500 parts of water was allowed to stand for 18 hours at room temperature (23–25° C.) and then passed through a 1½" x 30" column of a commercially available cation exchange resin in the hydrogen form. The column was washed with distilled water until the pH of the effluent rose to 5. Upon evaporation of the washings at room temperature, there was obtained 24 parts of liquid residue, ten parts of which were dried in a vacuum desiccator over P$_2$O$_5$ for four days. There was thus obtained sulfodifluoroacetic acid hydrate as a white, very hygroscopic solid, melting at 45–47° C.

*Analysis.*—Calculated for $C_2H_2F_2O_5S \cdot 1\frac{1}{2}H_2O$: F, 18.7%; S, 15.8%; N. E., 101.5. Found: F, 18.8%; S, 15.7%; N. E., 101.4.

A solution of 4.06 parts of the above sulfodifluoroacetic acid hydrate in 25 parts of freshly boiled distilled water was added with stirring to a freshly filtered solution of 6.31 parts of barium hydroxide octahydrate in 100 parts of freshly boiled distilled water. A faint cloud formed in the solution and was removed by filtration. The resultant clear filtrate was evaporated to dryness at room temperature and then dried in a vacuum desiccator over P$_2$O$_5$. There was thus obtained 6.2 parts (94% of theory) of barium sulfodifluoroacetate monohydrate as a white crystalline solid, readily soluble in water.

*Analysis.*—Calculated for $C_2F_2O_5SBa \cdot 1H_2O$: Ba, 41.7%; S, 9.7%. Found: Ba, 41.0%; S, 9.9%.

In the same fashion using 2.03 parts of the above sulfodifluoroacetic acid hydrate and substituting 1.1 parts of powdered calcium carbonate for the barium hydroxide, there was thus obtained an over 90% yield of calcium sulfodifluoroacetate trihydrate as a white crystalline solid.

*Analysis.*—Calculated for $C_2F_2O_5SCa \cdot 3H_2O$: Ca, 14.9%; H$_2$O, 20.2%. Found: Ca, 14.3%; H$_2$O, 20.9%.

EXAMPLE IV

*Preparation of methyl fluorosulfonyldifluoroacetate*

To a cooled (10° C.) solution of 36 parts of a 3,3,4,4-tetrafluoro-2,2-dioxo-1,2-oxathietane in about 140 parts of anhydrous diethyl ether was added with stirring 10.8 parts of sodium methoxide at a rate to maintain gentle reflux. At the end of the addition, the reaction mixture was stirred at room temperature for one hour and allowed to stand for 2.5 days. The precipitated sodium fluoride was removed by filtration. Upon distillation of the filtrate, there was obtained 19 parts (50% of theory) of methyl fluorosulfonyldifluoroacetate as a clear, colorless liquid boiling at 118° C. at atmospheric pressure; $n_D^{25}$, 1.3500.

*Analysis.*—Calculated for $C_3H_3F_3O_4S$: F, 29.7%; S, 16.7%. Found: F, 29.8%; S, 16.0%.

EXAMPLE V

*Preparation of isopropyl fluorosulfonyldifluoroacetate*

A solution of 8 parts of isopropyl alcohol in about 70 parts of anhydrous diethyl ether was added with vigorous stirring dropwise over a period of ½ hour to a cooled solution (10° C.) of 21 parts of fluorosulfonyldifluoroacetyl fluoride in about 70 parts of anhydrous diethyl ether. At the end of the addition, the reaction mixture was warmed for ½ hour at steam bath temperatures and then washed twice with 10% aqueous sodium chloride solution. The ether layer was separated and dried over anhydrous magnesium sulfate. Upon fractional distillation there was obtained 10 parts (47% of theory) of isopropyl fluorosulfonyldifluoroacetate as a clear, colorless liquid boiling at 132–134° C. at atmospheric pressure; $n_D^{25}$, 1.3572. The product exhibited nuclear magnetic resonance spectra consistent with the indicated structure—see also Example VI.

In the same fashion, using other alcohols and thiols, other esters and thiolesters of the α-sulfoperfluorocarboxylic acids of this invention can be prepared. Thus, substituting 2,2,2-trichloroethanol and benzenethiol for the above isopropyl alcohol, there were obtained, respectively, the following products:

| Product | Percent Yield | B. P. °C./mm. | $n_D^{25}$ | Percent Analyzed | |
| --- | --- | --- | --- | --- | --- |
| | | | | Calc'd | Found |
| 2,2,2-Trichloroethyl fluorosulfonyldifluoroacetate. | 48 | 111–113/5.5 | 1.4171 | S, 10.3<br>Cl, 34.4 | 10.1<br>36.4 |
| Phenyl fluorosulfonyldifluorothiolacetate. | 42 | 98–99/5.5 | 1.4931 | F, 21.1<br>S, 23.7 | 21.1<br>23.8 |

EXAMPLE VI

*Preparation of n-octyl fluorosulfonyldifluoroacetate*

To a cooled (ice/water bath) solution of 26 parts of n-octanol in about 75 parts of petroleum ether was added dropwise with vigorous stirring a solution of 36 parts of 3,3,4,4-tetrafluoro-2,2-dioxo-1,2-oxathietane in about 75 parts of petroleum ether, the resulting mixture stirred for one hour at room temperature after the addition was completed, and finally allowed to stand at room temperature overnight. The reaction mixture was washed twice with 10% aqueous sodium chloride solution and the organic layer separated and dried over anhydrous magnesium sulfate. Upon fractional distillation, there was obtained 48 parts of crude liquid product boiling at 96–98° C. under pressures corresponding to 6 mm. mercury. Upon a further distillation through a precision fractionation column, there was obtained 43 parts (70% of theory) of n-octyl fluorosulfonyldifluoroacetate as a clear, colorless liquid boiling at 85–88° C. under pressures corresponding respectively to 3 and 5 mm. of mercury; $n_D^{25}$, 1.3957.

*Analysis.*—Calculated for $C_{10}H_{17}F_3O_4S$: F, 20.3%; S, 11.7%. Found: F, 19.3%; S, 11.7%.

In the same fashion using other alcohols, including glycols, other esters of the α-sulfoperfluorocarboxylic acids of this invention are prepared. The thietane can be added to the alcohol as above or vice versa, although generally better results are obtained under the former conditions. Other inert, liquid organic reaction media, such as pentane, hexane, dioxane, carbon tetrachloride can be used interchangeably with the petroleum ether. The reaction may also be conducted in the absence of a solvent (see Example VII). Thus, substituting ethylene glycol, methanol, isopropanol, and n-2,2,3,3,4,4,5,5-octafluoropentanol for the above n-octanol, there were obtained, respectively, the following products:

25.0 parts of 3,3,4,4-tetrafluoro-2,2-dioxo-1,2-oxathietane was allowed to stand under anhydrous conditions at room temperature for 24 hours. The reaction mixture was then filtered as rapidly as possible and the filtrate fractionated through a precision still. The fraction boiling at 80–90° C. under a pressure corresponding to 100 mm. of mercury was redistilled. There was thus obtained five parts of fluorosulfonyldifluoroacetyl thiocyanate as a yellow liquid boiling at 87° C. under a pressure corresponding to 106 mm. of mercury; $n_D^{25}$, 1.4567. Nuclear magnetic resonance spectra showed the absence of any hydrogen in the molecule and indicated the correct peaks for the fluorine atoms.

*Analysis.*—Calculated for $C_3F_3NO_3S_2$: N, 6.4%; F, 26.0%. Found: N, 6.2%; F, 26.0%.

EXAMPLE IX

*Preparation of N-n-butylfluorosulfonyldifluoroacetamide and N-n-butyl(n-butylsulfamyl)difluoroacetamide*

A solution of 66 parts of 3,3,4,4-tetrafluoro-2,2-dioxo-1,2-oxathietane in 80 parts of anhydrous diethyl ether was added dropwise with stirring to a cooled (10° C.) solution of 58.4 g. of n-butylamine in 80 parts of anhydrous diethyl ether. The reaction was vigorous. When the addition was completed the reaction mixture was filtered and the filtrate washed with aqueous 10% sodium chloride solution. The ether layer was separated and dried over anhydrous magnesium sulfate. From this by precision fractionation, there was obtained 22.7 parts (15% of theory) of N-n-butylfluorosulfonyldifluoroacetamide as a clear, colorless liquid boiling at 97.0–97.5° C. under a pressure corresponding to 4 mm. of mercury; $n_D^{25}$, 1.4076, and 13 parts (10% of theory) of N-n-butyl-(n-butylsulfamyl)difluoroacetamide as a crystalline solid melting at 39–42° C. and boiling as a clear, colorless liquid at 190–191° C. under a pressure corresponding to 4 mm. of mercury.

| Product | Esters | | $n_D^{25}$ | Percent Analysis | |
|---|---|---|---|---|---|
| | Yield, percent | B. P. | | Calc'd | Found |
| Ethylene-bis(fluorosulfonyldifluoroacetate). | 51 | 124–125° C./7 mm | 1.3830 | F, 29.5<br>S, 16.7 | F, 30.7<br>S, 16.9 |
| Methyl fluorosulfonyldifluoroacetate. | 20 | 115–116° C | 1.3506 | See Example III | |
| Isopropyl fluorosulfonyldifluoroacetate. | 30 | 133–134° C | 1.3571 | F, 25.9<br>S, 14.6<br>N. E., 110 | F, 25.6<br>S, 14.5<br>N. E., 113 |
| n-2,2,3,3,4,4,5,5-Octafluoropentyl fluorosulfonyldifluoroacetate. | 30 | 98–99° C./30 mm | 1.3334 | F, 53.3<br>S, 8.2 | F, 55.7<br>S, 8.0 |

EXAMPLE VII

*Preparation of phenyl fluorosulfonyldifluoroacetate*

A mixture of 47 parts of phenol and 90 parts of 3,3,4,4-tetrafluoro-2,2-dioxo-1,2-oxathietane was stirred at ice/water bath temperatures until the spontaneous reaction ceased and slowly warmed to 25° C. at which temperature the reaction mixture was held for two hours with stirring. The resulting reaction mixture was purified by fractionation and after a second precision distillation there was obtained 52.6 parts (36% of theory) of phenyl fluorosulfonyldifluoroacetate as a slightly colored liquid boiling at 91.5–92.5° C. under a pressure corresponding to 30 mm. of mercury; $n_D^{25}$, 1.4350.

*Analysis.*—Calculated for $C_8H_5F_3O_4S$: F, 22.4%; S, 12.6%. Found: F, 20.9%; S, 12.7%.

EXAMPLE VIII

*Preparation of fluorosulfonyldifluoroacetyl thiocyanate*

A mixture of 20.3 parts of sodium thiocyanate and

*Analysis.*—Calculated for $C_6H_{10}F_3NO_3S$: F, 24.4%; N, 6.0%; S, 13.7%. Found: F, 24.3%; N, 5.8%; S, 13.5%.

*Analysis.*—Calculated for $C_{10}H_{20}F_2N_2O_3S$: F, 13.3%; N, 9.8%; S, 11.2%. Found: F, 13.1%; N, 9.7%; S, 10.6%.

In the same fashion using other amines, other carboxamides, sulfoamides, and amine salts of the sulfodifluoroacetic acid of this invention are prepared. The thietane can be added to the amine or vice versa. Other inert, liquid organic reaction media, such as pentane, hexane, cyclohexane, dioxane and anhydrous diethyl ether can be used interchangeably with the petroleum ether. The disubstituted products are obtained when the amine reactant is present in greater than equimolar proportions based on the thietane. Thus, substituting n-octylamine, diethylamine, aniline, anisidine, N-methylaniline, morpholine, diphenylamine, and 2,5-dimethylpiperazine for the above n-butylamine, there were obtained, respectively, the following products.

AMIDES AND AMINE SALTS

| Product | Yield, percent | B. P. | $n_D^{25}$ | Percent Analysis Calc'd | Found |
|---|---|---|---|---|---|
| N-n-Octylfluorosulfonyldifluoroacetamide | 27 | 163–164° C./20 mm | 1.4237 | F, 19.7<br>N, 4.8<br>S, 11.1 | 19.0<br>4.9<br>10.9 |
| N-n-Octyl(n-octylsulfamyl)difluoroacetamide | 35 | 250–270° C./20 mm | 1.4561 | F, 9.6<br>N, 7.0<br>S, 8.0 | 8.3<br>7.2<br>8.3 |
| N,N-Diethylfluorosulfonyldifluoroacetamide | 63 | 120–121° C./20 mm | 1.4092 | F, 24.5<br>N, 6.3<br>S, 13.7<br>N.E., 116.8 | 24.0<br>6.1<br>13.8<br>118 |

| Product | Yield, percent | M. P. | Crystals | Calc'd | Found |
|---|---|---|---|---|---|
| N-Phenylfluorosulfonyldifluoroacetamide | 98 | 107–108° C | White | F, 22.5<br>N, 5.5<br>S, 12.6 | 22.9<br>5.6<br>12.6 |
| Anilinium (phenylcarbamoyl)difluoromethanesulfonate | 84 | 218–219° C | Sol. hot water | F, 11.0<br>N, 8.1<br>S, 9.3<br>N.E., 344 | 10.8<br>8.2<br>9.2<br>332 |
| Anisidinium (p-methoxyphenylcarbamoyl)difluoromethanesulfonate | 33 | 201–203° C | do | N, 6.9<br>N.E., 404 | 7.0<br>371 |
| N-(p-Methoxyphenyl) (p-methoxyphenylsulfamyl)difluoroacetamide | 25 | 177–179° C | Insol. hot water | N, 7.2<br>N.E., 386 | 7.3<br>395 |
| (N-Methyl, N-phenyl)fluorosulfonyldifluoroacetamide | 70 | 69–71° C |  | F, 21.3<br>N, 5.2<br>S, 12.0<br>N.E., 134 | 21.5<br>5.4<br>12.0<br>137 |
| Fluorosulfonyldifluoroacetylmorpholine [i. e., fluorosulfonyldifluoroacetic acid morpholide] | 45 | 72–73° C |  | F, 23.1<br>N, 5.7<br>S, 13.0 | 23.3<br>5.5<br>12.8 |
| N,N-Diphenylfluorosulfonyldifluoroacetamide | 50 | 75–76° C |  | F, 17.3<br>N, 4.1<br>S, 9.8 | 15.7<br>4.3<br>9.7 |
| 1,4-Bis(fluorosulfonyldifluoroacetyl)-2,5-dimethylpiperazine | 64 | 212–214° C | White | F, 26.3<br>N, 6.4<br>S, 14.8 | 26.4<br>6.5<br>14.6 |

EXAMPLE X

*Preparation of sodium (phenylcarbamoyl)difluoromethanesulfonate*

To a solution of 1.2 parts of sodium hydroxide in 100 parts of water, was added 1.2 parts of the anilinium (phenylcarbamoyl)difluoromethanesulfonate of Example IX. The resultant solution exhibited a pH of 6; sufficient caustic was then added to bring the pH to 8.9. The resultant clear solution was then filtered and the filtrate evaporated on the steam bath under nitrogen. There was thus obtained as a residue 8.1 parts (99% of theory) of sodium (phenylcarbamoyl)difluoromethanesulfonate as a white crystalline solid.

*Analysis.*—Calculated for $C_8H_6F_2NO_4SNa$: N, 5.1%. Found: N, 4.8%.

EXAMPLE XI

*Preparation of fluorosulfonyldifluorothiolacetic acid*

A pressure reactor was flushed with nitrogen and charged with 36 parts of 3,3,4,4-tetrafluoro-2,2-dioxo-1,2-oxathietane, flushed again with nitrogen, sealed and pressured to 1000 atmospheres with gaseous hydrogen sulfide. The reactor was maintained under these conditions at room temperature with shaking for several hours and then opened slowly with the gaseous products being bled to atmospheric pressure through a scrubber containing petroleum ether. The lower layer of the resultant petroleum ether mixture was removed and upon distillation there was obtained eight parts of crude fluorosulfonyldifluorothiolacetic acid (21% of theory) as a clear, water-soluble liquid boiling at 57–65° C. under a pressure corresponding to 8 mm. of mercury and exhibiting an odor typical of sulfur compounds, particularly those containing a thiol group.

*Analysis.*—Calculated for $C_2HF_3O_3S_2$: N. E., 64.7. Found: N. E., 71.4.

Nuclear magnetic resonance spectra showed fluorine resonance characteristic of the fluorosulfonyldifluoromethyl group and proton resonance with a single peak intermediate in position to the proton resonance peak for acetic and thiolacetic acid and thus consistent with a thiolocarboxymethyl group, that is, a thiolocarboxy group polarized by linkage to an adjacent difluoromethylene group.

EXAMPLE XII

*Preparation of fluorosulfonyldifluoroacethylurea (fluorosulfonyldifluoroacetic acid ureide)*

A solution of 72 parts of 3,3,4,4-tetrafluoro-2,2-dioxo-1,2-oxathietane in about 175 parts of petroleum ether was added dropwise with stirring to a cooled (10° C.) suspension of 24 parts of urea in about 150 parts of petroleum ether. The reaction was vigorous and when the addition was completed the reaction mixture was stirred over a period of three hours while the temperature was allowed to rise to 25° C. After standing overnight, the reaction mixture was filtered and after drying there was thus obtained 85 parts of crude fluorosulfonyldifluoroacetylurea as a white powder melting at 144–147° C. After one recrystallization from methanol and an ether wash, the solid white crystals obtained from the diethyl ether washings on evaporation were fluorosulfonyldifluoroacetylurea, i. e., fluorosulfonyldifluoroacetic acid ureide, melting at 150–152° C.

*Analysis.*—Calculated for $C_3H_3F_3O_4N_2S$: F, 25.8%; N, 12.7%; S, 14.5%. Found: F, 23.6%; N, 12.9%; S, 13.8%.

EXAMPLE XIII

*Part A.—Preparation of 3-trifluoromethyl-3,4,4-trifluoro-2,2-dioxo-1,2-oxathietane*

A mixture of 150 parts of hexafluoropropene and 60 parts (0.75 molar proportion based on the propene) of freshly distilled, liquid, anhydrous sulfur trioxide was heated at 60° C. for 8 hours at autogenous pressure in a closed, stainless steel-lined, pressure vessel. The reaction mixture was allowed to cool to room temperature, vented to the atmosphere and distilled through a precision fractionating column. There was thus obtained 73.7 parts (42.7% of theory) of 2-hydroxy-1-trifluoromethyl1,2,2-trifluoroethanesulfonic acid sultone (3-trifluoromethyl- 3,4,4-trifluoro-2,2-dioxo-1,2-oxathietane) as a clear, colorless liquid boiling at 46.5° C. at atmospheric pressure.

*Analysis.*—Calculated for $C_3F_6O_3S$: C, 15.7%; H, 0.0%; S, 13.9%; F, 49.5%. Found: C, 15.6%; H, 0.5%; S, 14.0%; F, 48.7%.

As further characterization the liquid product exhibited a nuclear magnetic resonance spectrum consistent with the four-membered sultone structure. This compound and the preparation thereof form a part of and are explained more fully in the copending application of Anderson and England, application Serial No. 552,224, filed December 9, 1955.

*Part B.—Preparation of (N-methyl-N-phenyl)fluorosulfonyl (trifluoromethyl)fluoroacetamide*

A solution of 23.0 parts of 3-trifluoromethyl-3,4,4-trifluoro-2,2-dioxo-1,2-oxathietane in about 80 parts of anhydrous diethyl ether was cooled in an ice/water bath and a solution of 21.4 parts of N-methylaniline in about 80 parts of anhydrous diethyl ether was added dropwise with vigorous stirring over a period of about one-half hour. When the addition was completed, the reaction mixture was stirred for an additional hour and then allowed to stand overnight to come to room temperature. The reaction mixture was then filtered and the filtrate washed twice with aqueous 10% sodium chloride solution. The ether layer was separated and dried over anhydrous magnesium sulfate. After filtration and removal of the diethyl ether by distillation, there was obtained upon precision fractionation about 5.5 parts of recovered N-methylaniline and 19.7 parts (62% of theory) of (N-methyl - N-phenyl)fluorosulfonyl(trifluoromethyl)fluoroacetamide as a clear, colorless liquid boiling at 108–110° C. under a pressure corresponding to 2 mm. of mercury; $n_D^{25}$, 1.4598.

*Analysis.*—Calculated for $C_{10}H_8F_5O_3NS$: N, 4.4%; F, 30.0%. Found: N, 5.0%; F, 29.2%.

EXAMPLE XIV

*Preparation of 2-ethylhexyl fluorosulfonyl(trifluoromethyl)fluoroacetate*

A solution of 14.0 parts of 2-ethylhexanol in about 85 parts of petroleum ether was added dropwise with vigorous stirring to a cooled (ice/water bath) solution of 23.0 parts of 3-trifluoromethyl-3,4,4-trifluoro-2,2-dioxo-1,2-oxathietane (see Example XIII, Part A) in about 85 parts of petroleum ether over a period of about one-half hour. When the addition was completed, the reaction mixture was stirred for about two hours to warm to room temperature and then let stand an additional two hours. The reaction mixture was then washed twice with aqueous 10% sodium chloride solution and twice with water. The petroleum ether layer was separated and dried over anhydrous magnesium sulfate. After filtration and removal of the petroleum ether solvent by distillation, there was obtained by precision fractionation 20.7 parts (63% of theory) of 2-ethylhexyl fluorosulfonyl-(trifluoromethyl)fluoroacetate as a clear, colorless liquid boiling at 92–94° C. under a pressure corresponding to 8 mm. of mercury; $n_D^{25}$, 1.3855.

*Analysis.*—Calculated for $C_{11}H_{17}F_5O_4S$: S, 9.8%; F, 26.9%. Found: S, 9.4%; F, 26.9%.

The present invention has been illustrated above with considerable emphasis on the preparation of sulfodifluoroacetic acid and a multitude of derivatives thereof which are hydrolyzable to said acid and the illustration has been extended to the acid with the next higher perfluoroalkylidene radical since these are most conveniently available and fully illustrate the invention. The invention is, however, generic to α-sulfopolyfluorocarboxylic acids, i. e., to perfluorosulfoacetic and α-polyfluorocarbon-substituted α-fluorosulfoacetic acids in which the polyfluorocarbon group contains only fluorine and at the most one hydrogen and that in the omega position, and derivatives thereof hydrolyzable thereto. Particularly outstanding because of the readier availability of the necessary intermediates are such acids and derivatives thereof hydrolyzable thereto containing no more than eleven chain carbons, i. e., the single carbon linking the carboxylic and sulfonic acid groups, or derivatives thereof hydrolyzable thereto, plus a perfluoro-carbon or omega-monohydroperfluorocarbon radical of no more than ten carbons pendant on said α-carbon.

As illustrated in the foregoing examples, the derivatives of the sulfonic and carboxylic acid groups hydrolyzable thereto include: the respective acyl fluorides, chlorides, etc.; mono- and polyvalent salts of either or both acid groups, including the salts of any metallic element, and particularly the salts of the alkali forming metals, i. e., the alkali metal and alkaline earth metal salts, as well as the ammonium and amine salts; the esters of one or both acid groups, including the thiol esters; nitriles; the amides, including both primary, secondary and tertiary amides, of one or both acid groups, or the like. Generally speaking, any substituent radical present in these groups hydrolyzable to the respective acid groups usually is of no more than 18 carbons, is free of Zerewitinoff active hydrogen, and preferably contains no more than eight carbons, free of active, i. e., reactive, hydrogen. The most preferred compounds are the α-sulfoperfluoroalkanoic acids of no more than three carbons with the said acid groups or groups hydrolyzable thereto containing only substituents of no more than eight carbons each free of aliphatic unsaturation and Zerewitinoff active hydrogen.

The new class of compounds of this invention are defined chemically by the following simple structural formula:

in which X is fluorine or the group $(CF_2)_nY$ wherein Y is fluorine or hydrogen and $n$ is a whole integer from 1 to 10, inclusive, A represents a carboxyl group and B a sulfo group or groups hydrolyzable respectively thereto, including, for instance, the acid halides, e. g., the acid fluorides; the thiolo acids; the amides, including mono- and di-substituted amides; the esters and thiolo esters; the ammonium, substituted ammonium and metal salts; nitriles and the like, wherein any substituents in said acid precursor groups are alike or different and are generally wholly hydrocarbon free of aliphatic unsaturation and Zerewitinoff active hydrogen and preferably of no more than 18 carbons and the metals are those of groups I–VIII of the periodic table and preferably the alkali and alkaline earth metals. The radical

is preferably perfluorocarbon, and desirably perfluoroalkylidene. In the preferred compounds X is fluorine or perfluoromethyl and A and B are used to indicate the just-described groups hydrolyzable respectively to —$CO_2H$ and $SO_3H$ wherein any radical substituents R are monovalent organic radicals free of Zerewitinoff active hydrogen and of no more than eight carbons each. The most preferred compounds have any radical substituents R as above and also free of aliphatic unsaturation, i. e., nonaromatic unsaturation.

The new compounds of the present invention may conveniently be made employing as the raw materials the cyclic sultones of the corresponding 3,4,4-trifluoro-2,2-dioxo-1,2-thietanes carrying in the 3 position fluorine, perfluorocarbon, or omega-hydroperfluorocarbon radicals which can be made by the process of the copending application of Anderson and England, Serial No. 552,224, filed December 9, 1955, and whose preparation and properties are more fully explained therein. For the preparation of the sultone intermediates of the present invention a polyfluoroolefin having one and only one aliphatic unsaturation and that a terminal double bond, and other than carbon and fluorine at most one hydrogen and that in the omega position to the double bond, preferably having fluorine on each doubly bonded carbon, is reacted with freshly distilled, anhydrous sulfur trioxide under pressure if desired and with maintenance of moderate temperature, e. g., below 100° C. While any polyfluoro terminally unsaturated monoolefin can be employed the polyfluoro-1-alkenes are preferred and of these the polyfluoroalkenes of up to twelve carbons are particularly preferred because of greater availability, etc. The reaction mixture is fractionally distilled to separate the sultone from unreacted materials, etc. These sultones have the structural formula:

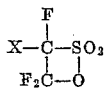

wherein X is fluorine or a monovalent perfluorocarbon or omega-hydroperfluorocarbon radical free of aliphatic unsaturation and of no more than ten carbons. The preferred sultones are those of the α-hydroxyperfluoroalkanesulfonic acids of up to three carbon atoms.

These sultones, as illustrated by the examples, can be used frequently as an intermediate for direct interaction with, for instance, an alcohol or an amine, or ammonia, to form the new esters and amides of the aforesaid described α-sulfopolyfluorocarboxylic acids. Alternatively, these sultones can be rearranged first under basic conditions, as shown in Example I, to form the diacid fluorides of the respective α-fluorosulfonylpolyfluorocarboxylic acids (which in themselves form a part of this new class since they are hydrolyzable to the corresponding dibasic acids) with the said diacid fluoride being later reacted with the other necessary intermediate to form the required derivative, e. g., with an alcohol, mercaptan, ammonia, hydrazine, or an amine or a metal hydroxide to form the corresponding esters, thioesters, amides, hydrazides, or salts of the α-sulfopolyfluorocarboxylic acids. For reasons as yet unknown, the rearrangement step has proven to be essential in the formation of the thiolo acids.

The acids of this invention and their salts, esters, and amides can be interconverted. Thus any of the α-fluorosulfonylpolyfluorocarboxylic acids or α-sulfopolyfluorocarboxylic acids of this invention can be directly converted to the bis-ammonium salt by a simple metathetical reaction with ammonium hydroxide. Polyvalent metal salts, e. g., those of copper, lead, nickel, cadmium, iron, zinc, tin, mercury, etc., can be made from the oxide or carbonate of the metal and an aqueous solution of the α-sulfopolyfluorocarboxylic acid. In the case of the alkali metals, the mono- or bis-salts can be achieved. However, in the case of the polyvalent metal ions, because of the high degree of stability afforded by the thereby achieved six-membered ring structure, only the mono salts are normally attained with both the carboxylic and sulfonic acid groups ionically salt linked to a single polyvalent metal ion.

The sulfonic acid esters are conveniently prepared by metathesis of the α-fluorosulfonylpolyfluorocarboxylic acids with a metal (e. g., a monovalent alkali metal) alcoholate of the desired alcohol, e. g., sodium methoxide, sodium phenolate, etc., followed by acidification of the resulting sodium carboxylate of the methyl or phenyl sulfonate. The carboxylic/sulfonic bis-esters are prepared from the fluorosulfonylpolyfluorocarboxylic acid esters by formation of the sodiosulfonyl salt and subsequent reaction with an ester, preferably an inorganic acid ester, e. g., a hydrohalic acid ester, of the desired alcohol. The α-sulfamyl and substituted sulfamylcarboxylic acids are prepared from the α-fluorosulfonylpolyfluorocarboxylic acids by heating first with ammonia or the necessary amine having hydrogen on nitrogen, e. g., diethylamine, cyclohexylamine, morpholine, piperidine, hexamethylenediamine, etc., and subsequent acidification.

The α-carbamoyl and substituted carbamoylpolyfluorosulfonates are prepared from the corresponding carbamoyl and substituted carbamoylpolyfluorosulfonyl fluorides and by alcoholysis of the sulfonyl fluoride directly with a metal alcoholate of the desired alcohol. The hydrazides and substituted hydrazides of either or both the sulfonic or carboxylic acid groups are prepared in the manner above illustrated for the carboxylic acid amides and the sulfonic acid amides. Many other variations are possible in the many routes available for synthesis of the new derivatives of the α-sulfopolyfluorocarboxylic acid hydrolyzable to the said acids, these methods and the variations possible therein being well known to the skilled chemist.

By the methods above indicated there are prepared, in addition to the numerous derivatives prepared in the examples: the eleven carbon main chain α-fluorosulfonylperfluorocarboxylic acid fluoride, α-fluorosulfonylperfluorododecanoyl fluoride from 3-perfluorodecyl-3,4,4-trifluoro-2,2-dioxo-1,2-oxathietane by base catalyzed rearrangement as in Example I from which diacid fluoride the various salts, amides, esters, hydrazides are prepared as above; a polyvalent alkaline earth monometal salt of an α-sulfo nine-carbon main chain perfluorocarboxylic acid, i. e., barium α-sulfonatoperfluorodecanoate from 3-perfluorooctyl-3,4,4-trifluoro - 2,2 - dioxo-1,2-oxathietane by base catalyzed rearrangement, as in Example I, to the diacid fluoride and salt-forming metathesis with barium hydroxide; a seven carbon main chain hydrocarbon fluorosulfonylperfluorocarboxylate, e. g., n-propyl α-fluorosulfonylperfluorooctanoate from 3-perfluorohexyl-3,4,4-trifluoro-2,2-dioxo-1,2-oxathietane by reaction with sodium n-propoxide; and N,N'-bis branch chain eight carbon hydrocarbon sulfamyl six-carbon chain perfluorocarboxamide, e. g., N-2-ethylhexyl(2-ethylhexylsulfamyl)perfluoroheptanoamide from 3-perfluoropentyl-3,4,4-trifluoro-2,2-dioxo-1,2-oxathietane by reaction with two molar proportions of 2-ethylhexylamine; a cycloalkyl α-fluorosulfonyl four-carbon main chain perfluorocarboxylic acid ester, e. g., cyclohexyl α-fluorosulfonylperfluorovalerate from 3-perfluoropropyl-3,4,4-trifluoro-2,2-dioxo-1,2-oxathietane and cyclohexanol; a dihydrocarbon ester of an α-sulfoperfluorocarboxylic acid, e. g., dodecyl α-(methylsulfonato)perfluoropropionate from 3-perfluoromethyl-3,4,4-trifluoro-2,2-dioxo-1,2-oxathietane by reaction with dodecyl alcohol to form the dodecyl α-fluorosulfonylperfluoropropionate and metathesis thereof with sodium methylate to form the methyl sulfonic acid ester; an eighteen carbon hydrocarbon carboxylate of an α-fluorosulfonylperfluorocarboxylic acid, e. g., octadecyl α-fluorosulfonylperfluoroacetate from 3,3,4,4-tetrafluoro-2,2-dioxo-1,2-oxathietane and octadecyl alcohol; an aliphatically unsaturated hydrocarbon α-fluorosulfonylperfluorocarboxylate, e. g., decenyl α-fluorosulfonylperfluoroacetate from 3,3,4,4-tetrafluoro-2,2-dioxo-1,2-oxathietane and decenyl alcohol; etc.

By the methods for the examples given above, 3-(omega-hydroperfluorohexyl)-3,4,4-trifluoro - 2,2 - dioxo-1,2-oxathietane is reacted with a small amount of triethylamine to obtain α-fluorosulfonyl-omega-hydroperfluorooctanoyl fluoride. This acid difluoride is reacted with methyl alcohol to yield methyl α-fluorosulfonyl-omega-hydroperfluorooctanoate. Reaction of the acid difluoride with dibutylamine yields N-dibutyl α-fluorosulfonyl-omega-hydroperfluorooctanoamide.

The six carbon main chain α-fluorosulfonyl-omega-hydroperfluorohexanoyl fluoride is prepared by reacting 3-(omega-hydroperfluorobutyl) - 3,4,4 - trifluoro-2,2-dioxo-1,2-oxathietane with a small quantity of triethylamine. Treatment of the acid difluoride with water followed by reaction with sodium hydroxide and with barium hydroxide yields sodium and barium α-sulfonato-omega-hydroperfluorohexanoates, respectively.

N-diethyl α-fluorosulfonyl-omega-hydroperfluorododecanoamide is prepared by adding diethylamine gradually to a solution of 3-(omega-hydroperfluorodecyl)-3,4,4-trifluoro-2,2-dioxo-1,2-oxethietane in petroleum ether. This thietane is also reacted in the same manner with N-methylaniline to yield N-methylphenyl-α-fluorosulfonyl-omega-hydroperfluorododecanoamide.

The acid chloride, α-fluorosulfonyldifluoroacetyl chloride, is prepared by reacting α-fluorosulfonyldifluoroacetic acid with thionyl chloride and distilling the acid chloride from the reaction mixture. The diacid chloride, α-chlorosulfonyldifluoroacetyl chloride, is prepared by reacting α-sulfodifluoroacetic acid with phosphorus pentachloride and distilling the diacid chloride from the reaction mixture.

The new compounds of this invention, i. e., α-sulfopolyfluorocarboxylic acids and derivatives thereof hydrolyzable thereto are generically useful as bactericides, i. e., in decreasing and most desirably in preventing the growth of bacteria. Thus, the (N-methyl-N-phenyl)fluorosulfonyldifluoroacetamide of Example IX, when added in concentrations as low as 10 parts per million inhibits the growth of the bacterium *Clostridium pasteurianum* in a 2% aqueous sucrose solution containing added inorganic salts—said medium being described by Jensen et al., Linnean Soc., New South Wales, 72, 73 (1947).

The following detailed test data show this bactericidal effect against conventional test bacteria for the ethylene bis(fluorosulfonyldifluoroacetate) of Example VI, the phenyl fluorosulfonyldifluorothioloacetate of Example V, and the fluorosulfonyldifluoroacetyl urea of Example XII, in specific illustration of this generic utility of this new class of compounds.

The test bacteria were grown in 2% tryptose broth for 18–24 hours at 37° C. The test organism was then inoculated into melted 2% tryptose agar and this poured into sterile Petri plates and allowed to harden. One-half inch diameter paper disks of sterile filter paper impregnated with the compound under test were then placed on the surface of the inoculated agar plates and the plates incubated at 37° C. for 18–24 hours. Impregnation was carried out by treatment of the disks individually with 0.1 ml. of a solution of 50 mg. of the test compound in 5 ml. of acetone, followed by evaporation of the acetone—all at room temperature. The final concentration of compound per dry, treated disk, was 1000 micrograms (1000 μg.).

The width of the zone of inhibition of bacterial growth surrounding the paper disk was measured. This zone corresponds to the absence of all growth of the test organism and is indicative of the potency of the compound tested. In the absence of the additive there is no such zone, i. e., the organism grows in all areas. In Table I, the zones of inhibition (in mm.) are shown for the following compounds:

A=ethylene bis(fluorosulfonyldifluoroacetate)
B=phenyl fluorosulfonyldifluorothioloacetate
C=fluorosulfonyldifluoroacetyl urea

TABLE I.—ZONES OF INHIBITION (IN MM.), AGAR PLATE TEST

| Compound | Micrococcus pyogenes var. aureus, H Strain | Streptococcus faecalis, 10Cl | Escherichia coli, Strain 6A | Pseudomonas aeruginosa, Temple Strain |
|---|---|---|---|---|
| A | 21.2 | 21.8 | 18.3 | 19.7 |
| B | 23.0 | 18.7 | 14.8 | 14.2 |
| C | 13.8 | 14.8 | 14.3 | 14.6 |

The α-sulfopolyfluorocarboxylic acids and particularly the α-sulfoperfluorocarboxylic acids and the aforedescribed derivatives hydrolyzable thereto are also generically useful as insect damage control agents, especially for use with wool or woolen-based fabrics. These compounds are particularly effective in combatting fabric destruction and damage arising from the attack of the larvae of the black carpet beetle. Thus, when these new compounds are applied, either from solution in an inert diluent or directly with no diluent (more conveniently the former), to samples of woolen fabric in amounts such as to give from 0.5–5.0% of the compound based on the fabric, at which concentrations substantially no fabric damage or change in fabric properties occurs, damage from the black carpet beetle larvae is substantially completely prevented. Thus, the fluorosulfonyldifluoroacetyl fluoride of Example I was dissolved in methylene chloride at a concentration of 10% and swatches of single weight wool blanket fabric were immersed in said solution, for one hour at 25° C., removed, dried, washed briefly in cold water and dried again. The treated sample contained 0.82% fluorine by analysis (corresponding to about 1.95%, by weight of the fabric, of the acid fluoride). The treated sample was then exposed to larvae of the black carpet beetle for 21 days, at the end of which time the treated wool sample exhibited no real fabric damage (shearing of surface fibers only). In contrast, a control (untreated) wool blanket fabric sample, exposed at the same time and under the same conditions for the same length of time, showed 15% fabric damage. Furthermore, in the test with the treated fabric sample, there was obtained 7.1 mg. frass in contrast to the 13.8 mg. obtained in the duplicate tests with the control, i. e., untreated fabric sample. The term "frass" refers to the weight of fecal material passed by a No. 4 Gootch crucible and is an indirect measure of the wool consumed by the insects.

The new α-sulfopolyfluorocarboxylic acids and derivatives thereof hydrolyzable thereto of this invention are also useful for conversion thereto to the carboxylic acid halides. These are useful as agents or intermediates for improving the dyeability of fibers and fabrics, more particularly of fibers and fabrics prepared from synthetic polymers where adequate and especially good dyeability is frequently achieved only with extreme difficulty. Thus, when a fabric woven from fibers of polyethylene terephthalate was immersed in a petroleum ether solution of the α-fluorosulfonylperfluoroacetyl fluoride of this invention, dried and dyed with basic dyes, the treated sample showed a noticeable improvement, i. e., was more deeply colored, over a control sample of the untreated fabric dyed under identical conditions. The other derivatives of this invention can be converted to the acid chloride by conversion to the free acid and thence to the acid chloride (via thionyl chloride). The acid chlorides are substantially as effective as the acid fluoride.

The new products of this invention, because of their diacid functionality, are useful in the preparation of condensation polymers, including both polyesters and polyamides by reaction with the well-known classes of di- and higher functional glycols and diamines. More particularly, when the ethylene bis-(α-fluorosulfonylperfluoroacetate) of Example VI was reacted under polyester-forming conditions with hexamethylene glycol (see U. S. 2,071,250, -251, -253), there was obtained a soft, water-soluble, polyhexamethylene glycolethylene glycol mixed ester of perfluorosulfoacetic acid. The polymer on drawing while moist with water formed fibers. These water soluble fibers can be used in a multitude of uses now known for water soluble fibers. A relatively brittle, yellow, solid resin was obtained by reacting the sultone precursor of fluorosulfonylperfluoroacetyl fluoride, i. e., 3,3,4,4-tetrafluoro-2,2-dioxo-1,2-oxathietane, with a mixture of the three geometric isomers of bis(p-aminocyclohexyl)methane under polyamide-forming conditions (see above patents). This poly-bis(p-aminocyclohexyl)methane/perfluorosulfoacetic acid amide melted at 151–155° C., was soluble in acetone and dimethyl formamide, and upon analysis was shown to have a molecular weight of about 1100 corresponding to three units of the polyamide-forming ingredients, i. e., the diamine and the dibasic acid. The amine can be employed to impregnate and stiffen paper and cloth.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. A member of the class consisting of saturated α-sulfopolyfluoromonocarboxylic acids and derivatives thereof hydrolyzable thereto, said acids having the sulfo group, the carboxyl group and at least one fluorine attached to the terminal carbon of a saturated polyfluorocarbon radical, and having, in addition to fluorine and carbon in said radical, at most one other atom and that hydrogen on the omega carbon.

2. A saturated α-sulfopolyfluoromonocarboxylic acid having the sulfo group, the carboxyl group and at least one fluorine attached to the terminal carbon of a saturated polyfluorocarbon radical, and having, in addition to fluorine and carbon in said radical, at most one other atom and that hydrogen on the omega carbon.

3. An ester of an acid according to claim 2.
4. An acid halide of an acid according to claim 2.
5. An amide of an acid according to claim 2.
6. A saturated α-sulfopolyfluoroalkanoic acid having the sulfo sulfur and carboxyl carbon joined by a divalent polyfluoroalkylidene radical having fluorine on the one carbon bearing the free valences and having in addition to fluorine and carbon in said radical at most one other atom and that hydrogen on omega carbon.
7. A saturated α-sulfoperfluoromonocarboxylic acid having the sulfo sulfur and carboxyl carbon joined by a geminal divalent saturated perfluorocarbon radical, and having fluorine on the one carbon bearing both free valences.
8. A saturated α-sulfoperfluoroalkanoic acid having sulfo sulfur and carboxyl carbon joined by a perfluoroalkylidene radical.
9. A saturated α-sulfoperfluoroalkanoic acid having sulfo sulfur and carboxyl carbon joined by a perfluoroalkylidene radical of up to twelve carbons.
10. Sulfodifluoroacetic acid.
11. An acid halide of sulfodifluoroacetic acid.
12. An ester of sulfodifluoroacetic acid.
13. An alkyl ester of sulfodifluoroacetic acid.
14. A lower alkyl ester of sulfdifluoroacetic acid.
15. An amide of sulfodifluoroacetic acid.
16. Fluorosulfonyldifluoroacetyl fluoride.
17. A compound of the formula:

wherein (1) the groups on the carbon atom are joined only through said atom; (2) X is a member of the class consisting of fluorine and the group $-(CF_2)_nY$, $n$ being an integer from 1 to 10 and Y being a member of the class consisting of fluorine and hydrogen; (3) A is a member of the class consisting of carboxyl and groups hydrolyzable thereto; and (4) B is a member of the class consisting of sulfo and groups hydrolyzable thereto.

References Cited in the file of this patent

FOREIGN PATENTS 662,572   Great Britain _____ Dec. 5, 1951